(12) United States Patent  (10) Patent No.: US 8,382,193 B2
Ezaka  (45) Date of Patent: Feb. 26, 2013

(54) SPOILER

(75) Inventor: Hideki Ezaka, Anjo (JP)

(73) Assignee: Inoac Corporation, Aichi (JP)

( * ) Notice: Subject to any disclaimer, the term of this patent is extended or adjusted under 35 U.S.C. 154(b) by 0 days.

(21) Appl. No.: 13/545,436

(22) Filed: Jul. 10, 2012

(65) Prior Publication Data

US 2012/0274096 A1  Nov. 1, 2012

Related U.S. Application Data

(62) Division of application No. 12/838,702, filed on Jul. 19, 2010, now Pat. No. 8,251,435.

(51) Int. Cl.
*B60J 9/00* (2006.01)
(52) U.S. Cl. .................................................. 296/180.1
(58) Field of Classification Search ............... 296/180.1; 156/60, 73.1, 73.5, 73.6; 285/423
See application file for complete search history.

(56) References Cited

U.S. PATENT DOCUMENTS

| | | | | | |
|---|---|---|---|---|---|
| 5,839,028 | A | * | 11/1998 | Nomura et al. ............. | 399/109 |
| 5,878,309 | A | * | 3/1999 | Nomura et al. ............. | 399/111 |
| 6,118,957 | A | * | 9/2000 | Fujiwara et al. ............ | 399/103 |
| 6,169,865 | B1 | * | 1/2001 | Miyabe et al. .............. | 399/111 |
| 6,215,969 | B1 | * | 4/2001 | Nomura et al. ............. | 399/111 |
| 6,226,476 | B1 | * | 5/2001 | Miyabe et al. .............. | 399/111 |
| 6,276,789 | B1 | * | 8/2001 | Miyazaki et al. ............ | 347/86 |
| 6,343,192 | B1 | * | 1/2002 | Miyabe et al. .............. | 399/13 |
| 6,467,889 | B1 | * | 10/2002 | Miyazaki et al. ............ | 347/86 |
| 7,338,108 | B2 | * | 3/2008 | Iwatsuka et al. ............ | 296/97.1 |
| 7,354,061 | B2 | * | 4/2008 | Yasuda et al. .............. | 280/728.3 |
| 7,422,261 | B2 | * | 9/2008 | Zellner et al. .............. | 296/37.12 |
| 7,556,285 | B1 | * | 7/2009 | Hayashi ..................... | 280/728.3 |
| 7,637,300 | B2 | * | 12/2009 | Kimura et al. .............. | 156/580 |
| 7,862,671 | B2 | * | 1/2011 | Seliskar et al. ............. | 156/73.5 |
| 7,891,331 | B2 | * | 2/2011 | Kawarai ..................... | 123/184.61 |
| 8,020,978 | B2 | * | 9/2011 | Ogawa et al. ............... | 347/86 |
| 8,025,946 | B2 | * | 9/2011 | Fujita et al. ................. | 428/58 |
| 2002/0000711 | A1 | * | 1/2002 | Schmidt et al. ............. | 280/728.3 |
| 2005/0269804 | A1 | * | 12/2005 | Yamada et al. ............. | 280/728.3 |
| 2007/0029763 | A1 | * | 2/2007 | Hayashi ..................... | 280/728.3 |
| 2010/0078920 | A1 | * | 4/2010 | Terai et al. ................. | 280/728.3 |
| 2010/0273574 | A1 | * | 10/2010 | Yamamoto .................. | 473/346 |

FOREIGN PATENT DOCUMENTS

| | | |
|---|---|---|
| JP | 2001-260230 A | 9/2001 |
| JP | 2004-106765 A | 4/2004 |
| JP | 2004-306522 A | 11/2004 |
| JP | 2007-062439 A | 3/2007 |

* cited by examiner

*Primary Examiner* — Kiran B Patel
(74) *Attorney, Agent, or Firm* — Sughrue Mion, PLLC

(57) ABSTRACT

A spoiler includes an upper member and a lower member. The upper and lower members are joined together by vibration welding. One of the upper and lower members includes a main welding rib and an auxiliary welding rib. Each of the main welding rib and the auxiliary welding rib is protruded toward the other of the upper and members so as to be vibration welded to the other of the upper and lower members. The main welding rib is arranged to extend along a vibration direction of the vibration welding, and the auxiliary welding rib is arranged to extend along a direction perpendicular to the vibration direction. A height of the auxiliary welding rib is less than a height of the main welding rib before the vibration welding. The auxiliary welding rib is spaced apart from the main welding rib.

5 Claims, 8 Drawing Sheets

SPOILER

CROSS REFERENCE TO RELATED APPLICATION

This application is a Divisional Application of application Ser. No. 12/838,702, filed Jul. 19, 2010, the disclosure of which is incorporated herein by reference.

FIELD OF THE INVENTION

The present invention relates to a spoiler of an automobile.

DESCRIPTION OF RELATED ART

A spoiler is attached, for example, to a roof end or a portion above a rear window of an automobile, such as a minivan or a station wagon, and extends in a vehicle width direction. Spoilers are formed to have a hollow configuration using a synthetic resin material. For example, spoilers may be formed by blow molding (see, e.g., JP 2007-62439 A and JP 2004-106765 A).

Spoilers are often configured to accommodate, for example, an antenna, a wiper, etc. However, to arrange an antenna inside a blow-molded spoiler, a hole is bored in the spoiler, which increases the number of processes and raises a risk of damaging the antenna.

With view to addressing such drawbacks, a related art provides a two-piece spoiler having injection-molded upper and lower members that are joined by vibration welding (see, e.g., JP 2004-306522 A and JP 2001-260230 A).

FIGS. 9A to 9C illustrate an example of a related art two-piece spoiler having an upper member 20 and a lower member 30 that are joined by vibration welding along ribs 40. As illustrated in FIG. 9A, when a tearing force is applied to the spoiler in a vehicle width direction along which it extends, the spoiler may split back into the upper and lower members 20, 30 along the ribs 40 relatively easily as illustrated in FIG. 9B. While this defect may be remedied by thickening the ribs 40 to provide robustness, this may in turn cause a sink mark on a surface of the spoiler due to the welding on the thickened ribs, thereby adversely affecting an external appearance of the spoiler.

Further, when a related art two-piece spoiler is configured to accommodate an electronic device component, such as an AM/FM radio broadcast antenna and a digital TV broadcast antenna, vibration welding is carried out with the electronic device component arranged inside the spoiler, and therefore, there may still be a risk of damaging the electronic device component. While the spoiler may be configured to provide a sufficient space such that the electronic device component is not hit during the vibration welding, this results in an increase in size of the spoiler accordingly. Even if a sufficient space can be provided such that the electronic device component is not hit during the vibration welding, there arises a problem that the electronic device component may resonate with a vibration while the vehicle is moving, in which case the electronic device component may generate a noise or performance degradation due to its vibration.

BRIEF SUMMARY

Illustrative aspects of the present invention provide a spoiler in which a bonding strength in a vibration-welded structure is improved without adversely affecting an external appearance of the spoiler.

According to an illustrative aspect of the present invention, a spoiler includes an upper member and a lower member. The upper member and the lower member are made of a synthetic resin, and are joined together by vibration welding. One of the upper member and the lower member includes a main welding rib and an auxiliary welding rib. Each of the main welding rib and the auxiliary welding rib is protruded toward the other of the upper member and the lower member so as to be vibration welded to the other of the upper member and the lower member. The main welding rib is arranged to extend along a vibration direction of the vibration welding, and the auxiliary welding rib is arranged to extend along a direction perpendicular to the vibration direction. A height of the auxiliary welding rib is less than a height of the main welding rib before the vibration welding. The auxiliary welding rib is spaced apart from the main welding rib.

According to another illustrative aspect of the present invention, a method of manufacturing a spoiler includes providing an upper member and a lower member. The upper member and the lower member are made of a synthetic resin. One of the upper member and the lower member includes a main welding rib and an auxiliary welding rib. Each of the main welding rib and the auxiliary welding rib is protruded toward the other of the upper member and the lower member. The auxiliary welding rib is arranged to extend along a direction perpendicular to a direction along which the main welding rib extends. A height of the auxiliary welding rib is less than a height of the main welding rib. The auxiliary welding rib is spaced apart from the main welding rib. The method further includes joining the upper member and the lower member by vibration welding, during which a vibration is applied in the direction in which the main welding rib extends. The joining includes joining the main welding rib to the other of the upper member and the lower member, and subsequently joining the auxiliary welding rib to the other of the upper member and the lower member.

Other aspects and advantages of the invention will be apparent from the following description, the drawings and the claims.

and

Figure 10:
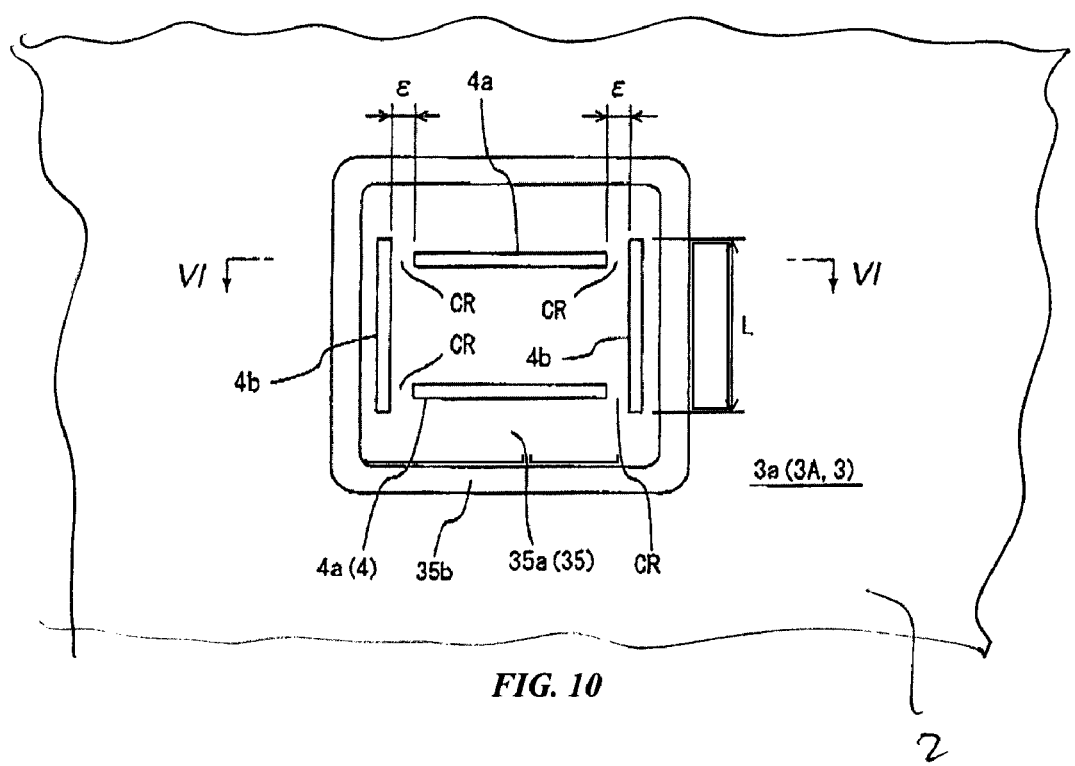

FIG. 10 is a schematic view showing an alternative embodiment in which the columnar support and the main and auxiliary ribs are provided on the upper member instead of the lower member.

DETAILED DESCRIPTION

Hereinafter, an exemplary embodiment of the present invention will be described in detail with reference to the drawings.

Figure 1:
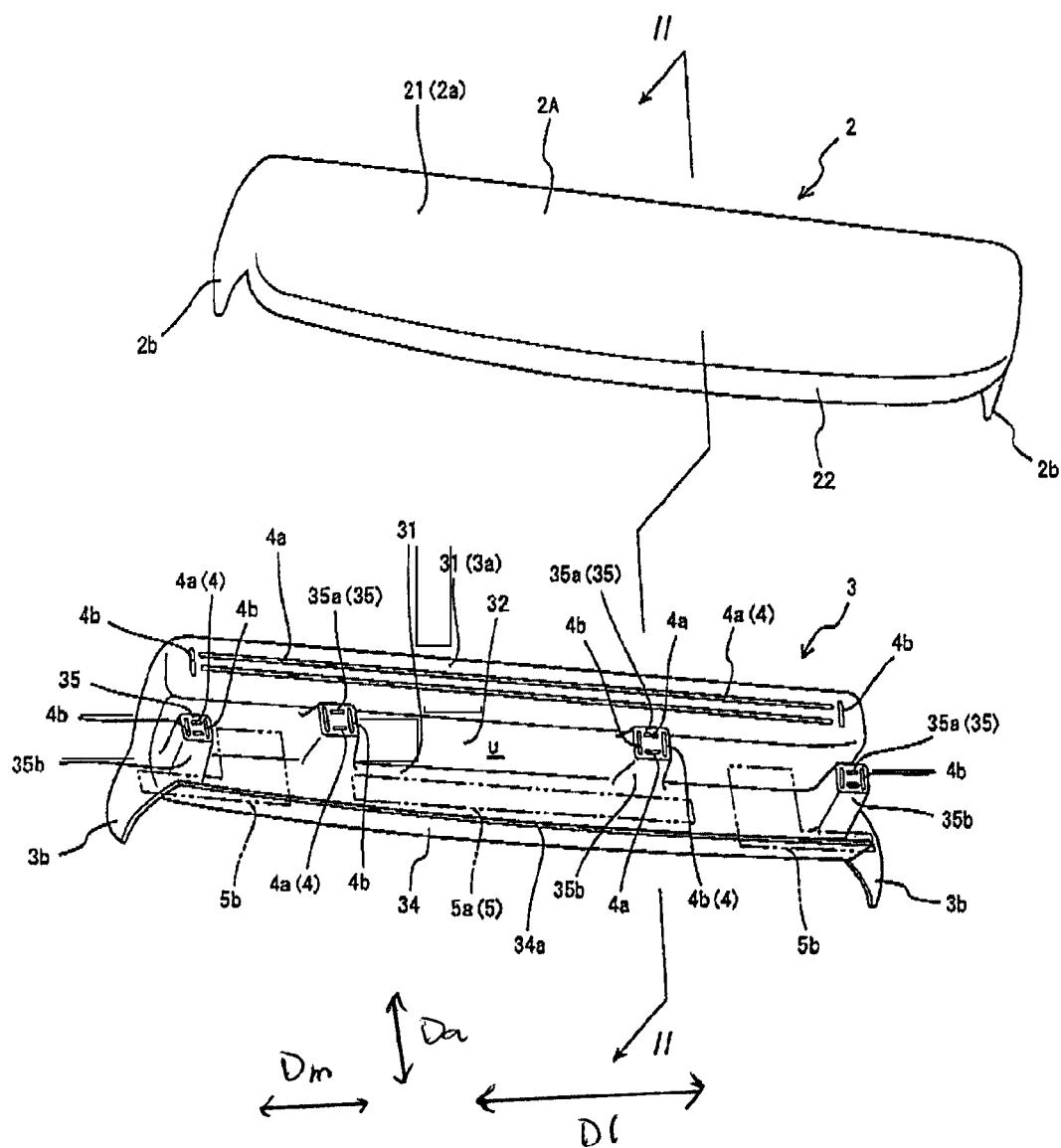
FIG. 1 is a simplified exploded perspective view of a spoiler according to an exemplary embodiment of the present invention.
Figure 2:
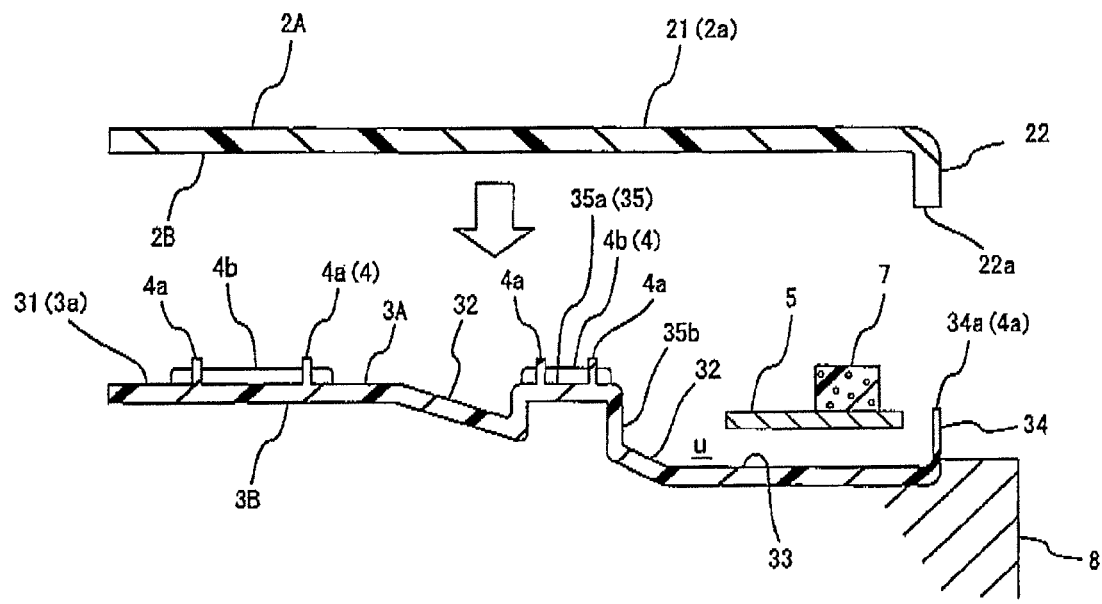
FIG. 2 is a sectional view taken along the line II-II in FIG. 1.
Figure 3:
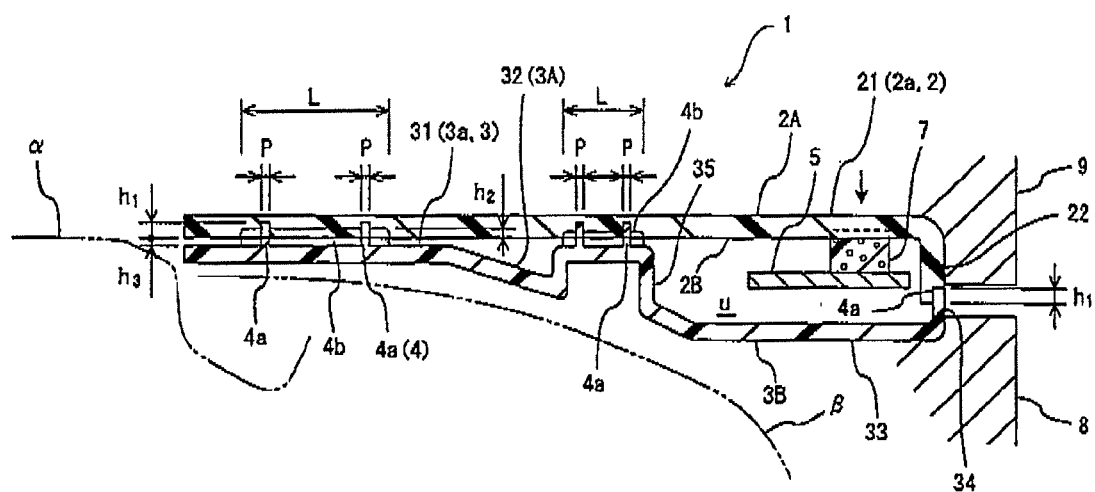
FIG. 3 is a sectional view of the spoiler in which upper and lower members are joined together.

As illustrated in FIGS. 1 to 3, a spoiler 1 according to an exemplary embodiment includes a synthetic resin lower member 3 having welding ribs 4, and a synthetic resin upper member 2. The lower member 3 and the upper member 2 are joined together by welding to form the spoiler 1. The spoiler 1 has a wing-like configuration extending in a vehicle width direction, and is attached to a rear hatch β adjacent to a roof end a of an automobile, such as a minivan or a station wagon, as illustrated in FIG. 3. The spoiler 1 is two-toned. That is, the lower member 3 is black, and the upper member 2 is painted to have the same color as a vehicle body.

The upper member 2 is an injection-molded member forming an upper half of the spoiler 1. A main body 2a of the upper member 2 is elongated in the vehicle width direction, which is a direction perpendicular to the plane of FIG. 2. As illustrated in FIG. 1, portions on both sides of the main body 2a are bent downward to form guard portions 2b.

The main body 2a of the upper member 2 includes a flat upper wall portion 21 whose upper face 2A serves as a design surface when the spoiler 1 is attached to the vehicle as illustrated in FIG. 3, and a vertical wall portion 22 extending downward from a rear side of the upper wall portion 21 such that the upper wall portion 21 and the vertical wall portion 22 form an L-shape in a sectional view. In the description, the term "downward" implies a direction toward the lower side of the vehicle, and the term "upward" implies a direction toward the upper side of the vehicle, in a state in which the spoiler 1 is attached to the rear hatch β as illustrated in FIG. 3. As illustrated in FIGS. 2 and 3, at the time of vibration welding, the upper member 2 is arranged to cover the lower member 3 from above, and is joined to the lower member 3.

Portions of the upper member 2 to be vibration-welded include a lower end face 22a of the vertical wall portion 22, extending in a longitudinal direction D1 of the upper member 2 along a rear side edge of the upper member 2, a front portion of the lower surface 2B of the upper wall portion 21, extending in the longitudinal direction D1 of the upper member 2 near the front side edge of the upper member 2; and another portion of the lower surface 2B of the upper wall portion 21, facing columnar supports 35 on the lower member 3. In order to minimize occurrence of sink marks or the like resulting from vibration welding, the upper member 2 has a wall thickness of 3.0 mm or more. The vibration-welded portions of the upper member 2 are abutted against the welding ribs 4 of the lower member 3 at the time of vibration welding.

The lower member 3 is joined to the upper member 2 to form a lower half of the spoiler 1. A main portion 3a of the lower member 3 is elongated in the vehicle width direction. As illustrated in FIG. 1, portions on both sides of the main portion 3a are bent downward to form cover portions 3b. When the lower member 3 and the upper member 2 are welded and joined together, the main body 2a of the upper member 2 overlaps the main portion 3a of the lower member 3, and the guard portions 2b of the upper member 2 covers the cover portions 3b of the lower member 3.

Figure 4:
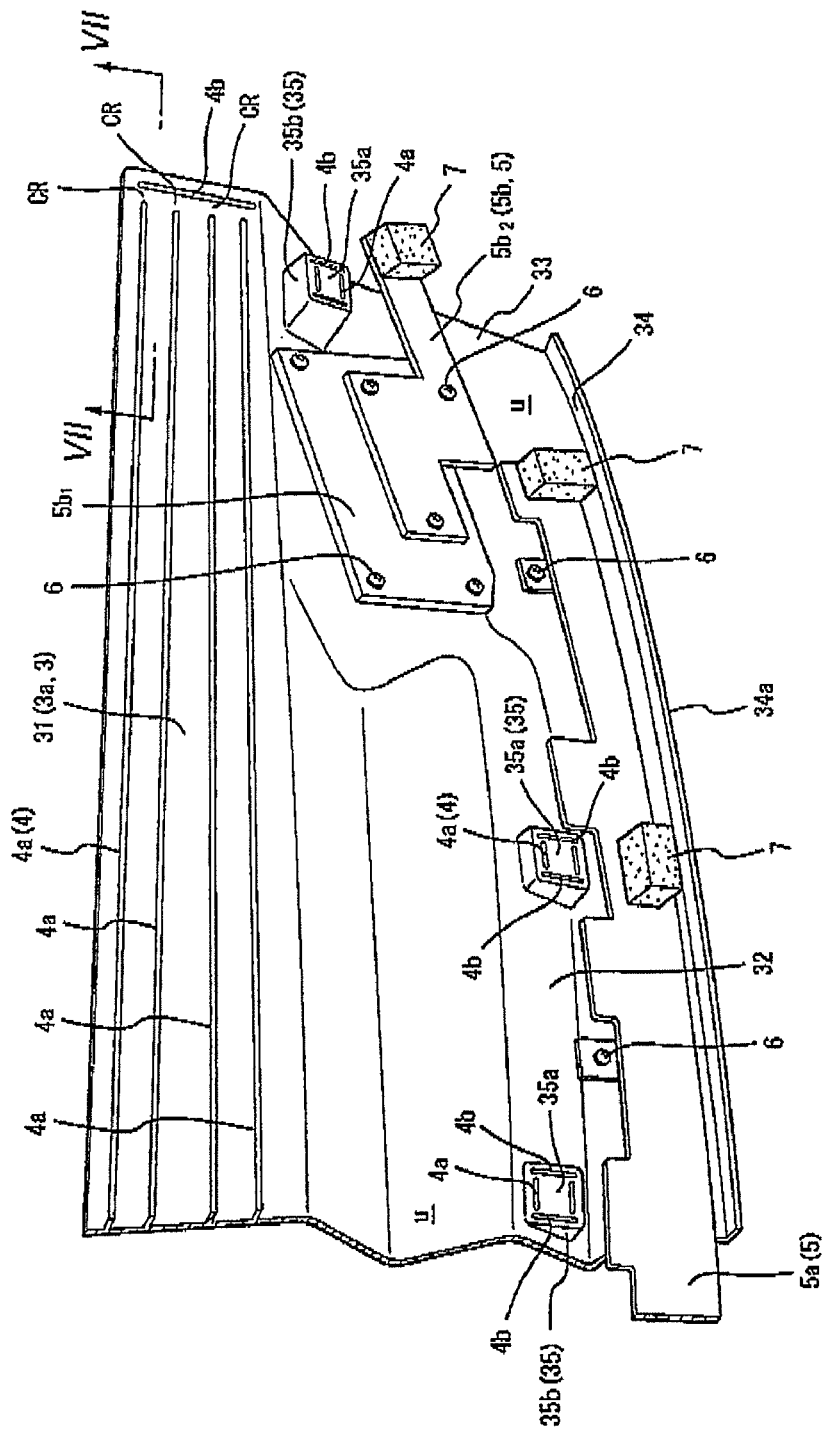
FIG. 4 is a partially enlarged perspective view of the lower member illustrated in FIG. 1.

The lower member 3 has substantially the same shape as the upper member 2 in plan view, and is provided with a recess u for accommodating electronic device components 5 as illustrated in FIGS. 2 to 4. In this exemplary embodiment, the electronic device components 5 include an FM/AM radio antenna 5a and digital TV antennas 5b. The electronic device components 5 may further include a stop lamp, etc., but illustration thereof is omitted. The main portion 3a of the lower member 3 includes a flat plate portion 31, a slope portion 32, a bottom plate portion 33; and an upright portion 34 as illustrated in FIGS. 1 and 2, and the recess u is formed by the slope portion 32, the bottom plate portion 33 and the upright portion 34. The recess u extends horizontally along the vehicle width direction. The flat plate portion 31 includes a front side edge of the lower member 3, and extends along the longitudinal direction of the upper member 2. The slope portion 32 extends obliquely downward and rearward from the flat plate portion 31, the bottom plate portion 33 extends rearward from the slope portion 32, and the upright portion 34 extends upward from a rear side of the bottom plate portion 33, whereby the recess u is formed to have a concave shape in a side view as illustrated in FIG. 2.

The lower member 3 has welding ribs 4 protruded toward the upper member 2. The welding ribs 4 are joined to the upper member 2 by vibration welding. The welding ribs 4 include main ribs 4a arranged along a vibration direction Dm of the vibration welding; and auxiliary ribs 4b arranged along a direction Da perpendicular to the vibration direction.

In the exemplary embodiment, the vibration direction at the time of vibration welding is a longitudinal direction of the flat plate portion 31, on which a plurality of main ribs 4a are arranged to extend along the longitudinal direction of the flat plate portion 31. The main ribs 4a are integrally formed with the lower member 3 in a one-piece structure by molding so as to vertically protrude from the flat plate portion 31. More specifically, according to the exemplary embodiment, four main ribs 4a are arranged on the flat plate portion 31 as illustrated in FIG. 4. It should be noted, however, that only the two of the main ribs 4a on the flat plate portion 31 are illustrated in FIGS. 1 to 3 for the sake of simplicity. Further, the main rib 34a (4a) is also provided at an upper part of the upright portion 34 so as to extend in the vibration direction, i.e., in the vehicle width direction. The main ribs 4a of the flat plate portion 31 primarily serves to provide bonding strength between the upper and lower members 2, 3 for the entire spoiler 1 including the front part of the spoiler 1. The main rib 34a (4a) on the upright portion 34 primarily serves to provide bonding strength between the upper and lower members 2, 3 in the rear part of the spoiler 1.

The flat plate portion 31 further has auxiliary ribs 4b, which will intersect the main ribs 4a if the main ribs 4a are extended, near the longitudinal ends of the main ribs 4a and near or on the longitudinal ends of the flat plate portion 31. The auxiliary ribs 4b are also molded integrally with the lower member 3 so as to protrude vertically from the flat plate portion 31. If the main ribs 4a are extended in the vibration direction, the main ribs 4a intersect the auxiliary ribs 4b. That is, each of the auxiliary ribs 4b is arranged near the respective longitudinal ends of the main ribs 4a such that each of the auxiliary ribs 4b intersects the imaginary extension lines IL extending from the respective longitudinal ends of the main ribs 4a and parallel to the longitudinal direction of the main ribs 4a. The auxiliary ribs 4b are arranged to prevent, upon application of an external force like a splitting force illustrated in FIGS. 9A and 9B, the upper and lower members 2, 3 from tearing apart from end portions of the main ribs 4a by guarding the upper and lower members 2, 3 against the external force before the external force reaches the main ribs 4a. Since the auxiliary ribs 4b are arranged to cross over the imaginary extension lines IL of all the main ribs 4a of the flat plate portion 31, thorough measures are taken against tearing caused by the external force.

In this exemplary embodiment, on the flat plate portion 31, a height of each of the auxiliary ribs 4b is less than a height of each of the main ribs 4a. Since the auxiliary ribs 4b are provided along the direction perpendicular to the vibration direction, if the height of each of the auxiliary ribs 4b is the same as the height of each of the main ribs 4a, the auxiliary ribs 4b may flutter during the vibration welding and may adversely affect an external appearance of the spoiler. However, by making the height of each of the auxiliary ribs 4b lower than the main ribs 4a, the fluttering during the vibration welding can be avoided. For example, the height of the auxiliary rib 4b may be less than the height of the main rib 4a in the range of 0.3 mm to 0.6 mm. In the exemplary embodiment, the height of the main rib 4a is 0.9 mm to 1.2 mm, and the height of the auxiliary rib 4b is 0.4 mm to 0.7 mm.

Moreover, the respective auxiliary ribs 4b are spaced apart from the main ribs 4a. If the auxiliary ribs 4b and the main ribs 4a are not separated from each other and connected to each other, there will be no space for a molten resin to escape at the connected position during the vibration welding, thereby facilitating occurrence of sink marks. By providing a spaced region CR between the auxiliary ribs 4b and the respective main ribs 4a, a molten resin can escape into the spaced region CR, thereby preventing the occurrence of sink marks. A gap $\epsilon$ of at least 2 mm is provided at the spaced region CR between each of the main ribs 4a extending in the vibration direction, and the auxiliary ribs 4b extending perpendicularly to the main rib 4a. At the time of vibration welding, melting of a molten resin from each of the main ribs 4a and auxiliary ribs 4b reaches about 1 mm, and therefore, the auxiliary ribs 4b are located at a distance of at least 2 mm from the main ribs 4a.

In the exemplary embodiment, the columnar supports 35 are arranged in the recess u, and the welding ribs 4 are also arranged on the respective columnar supports 35. The columnar supports 35 are formed by partially bulging the slope portion 32 or the bottom plate portion 33 in a region where the electronic device components 5 are not accommodated.

As illustrated in FIG. 1, the columnar supports 35 may be arranged at two locations near both sides of the recess u by bulging the bottom plate portion 33. The columnar supports 35 may further be arranged other two locations closer to the center of the recess u by raising the slope portion 32. Each of the columnar supports 35 has a side wall 35b which is formed by the bulging. An upper end face 35a of each of the columnar supports 35 also serves as a region where the upper and lower members 2, 3 are joined together, and is formed with the main ribs 4a and the auxiliary ribs 4b.

Figure 5:
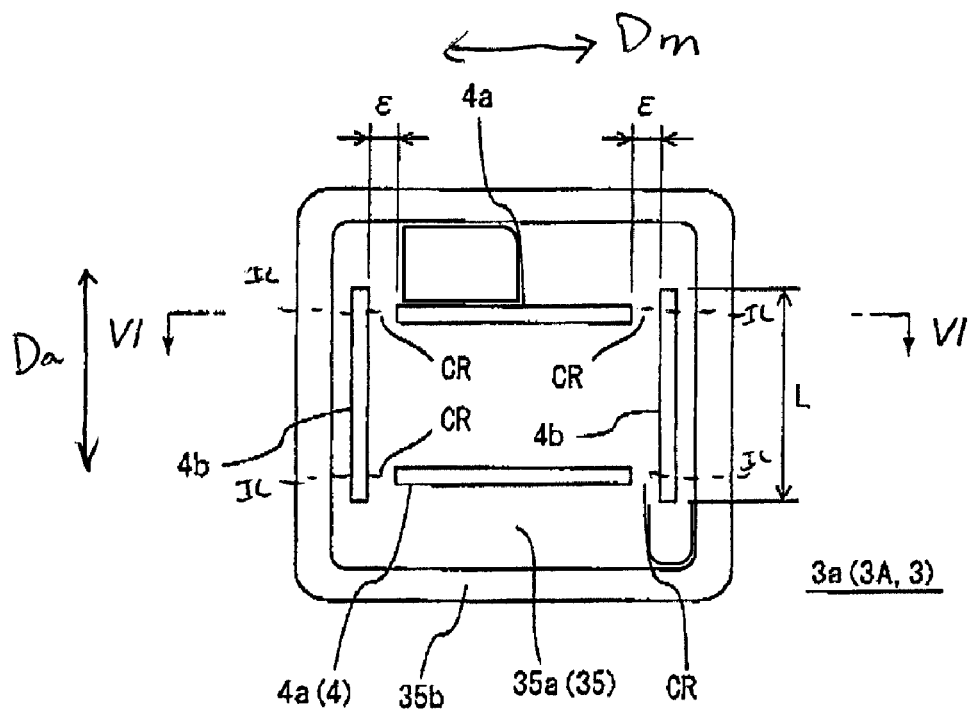
FIG. 5 is a top view of a columnar support of the spoiler.
Figure 6:
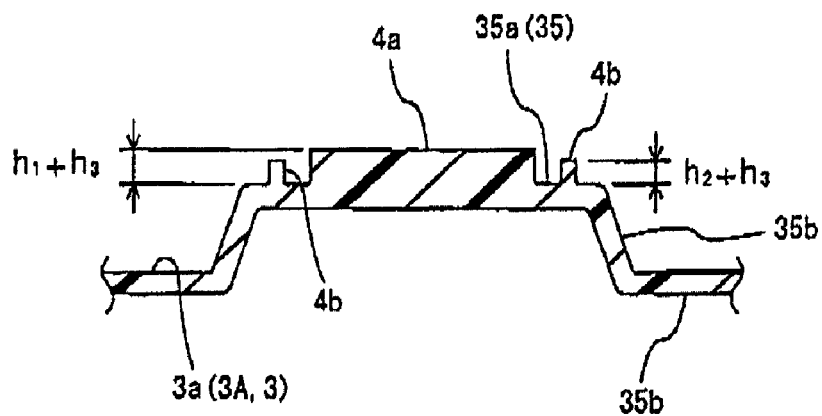
FIG. 6 is a sectional view of the columnar support taken along the line VI-VI in FIG. 5.
Figure 7:
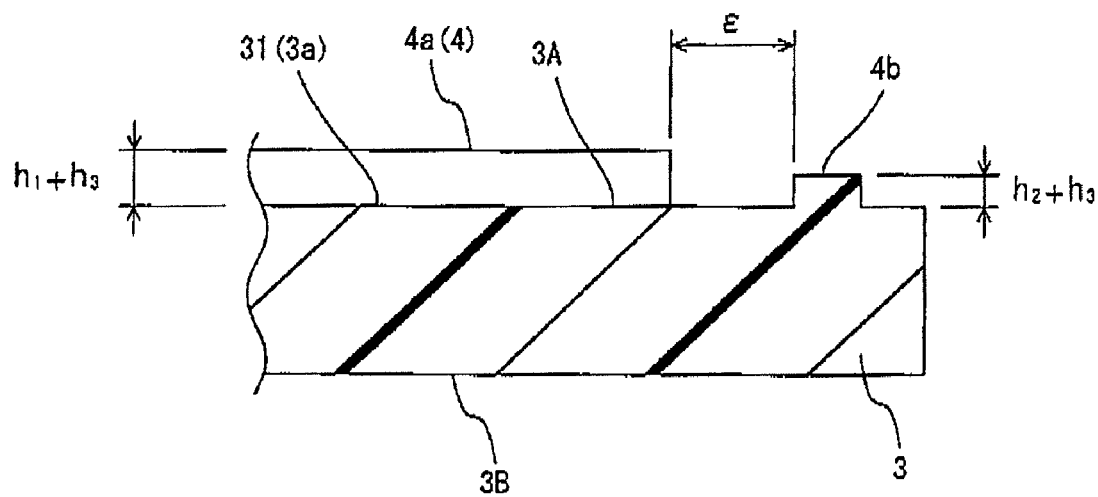
FIG. 7 is a sectional view taken along the line VII-VII of FIG. 4.
Figure 9A:
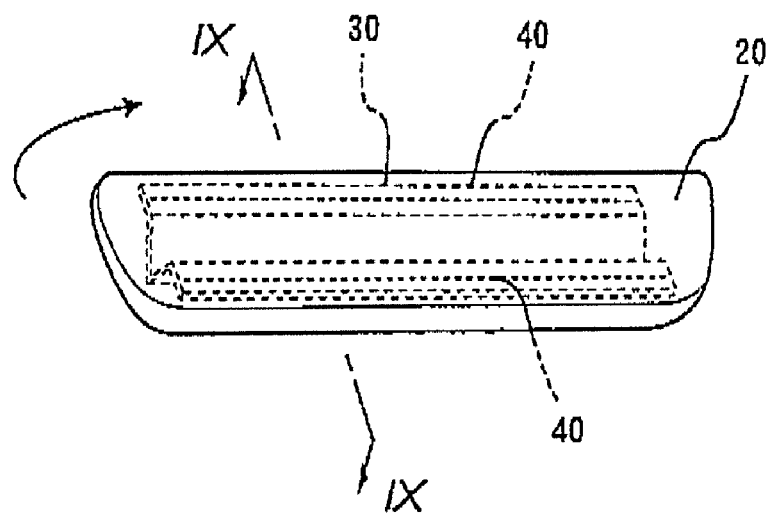
FIG. 9A is a perspective view of an example of a related art spoiler.
Figure 9B:
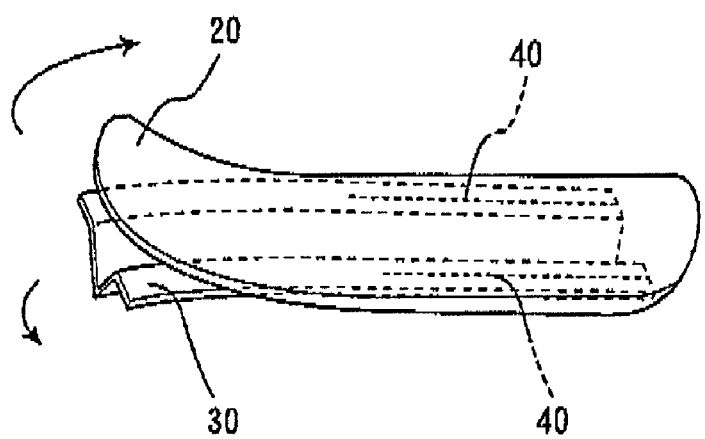
FIG. 9B is an explanatory view of the related art spoiler to which a tearing force is applied.

As illustrated in FIGS. 5 and 6, the upper end face 35a may have a rectangular shape, and the main ribs 4a extending in the vibration direction of the vibration welding and the auxiliary ribs 4b extending in the direction perpendicular to the vibration direction are arranged in the upper end face 35a. In this exemplary embodiment, two main ribs 4a are arranged on the upper end face 35a of each of the columnar supports 35. On the upper end face 35a, the auxiliary ribs 4b are arranged near or on the longitudinal ends of the upper end face 35a so as to be spaced apart from the respective main ribs 4a. If each of the main ribs 4a on the upper end face 35a is extended in the vibration direction, each of the main ribs 4a intersects the auxiliary ribs 4b on respective sides of the upper end face 35a as illustrated in FIG. 5. That is, each of the auxiliary ribs 4b is arranged near the respective longitudinal ends of the main ribs 4a such that each of the auxiliary ribs 4b intersects the imaginary extension lines extending from the respective longitudinal ends of the main ribs 4a and parallel to the longitudinal direction of the main ribs 4a. In FIGS. 1 and 2, a length of each of the main ribs 4a is shorter than a length of each of the auxiliary ribs 4b, but actually, according to the exemplary embodiment, the length of each of the main ribs 4a is longer than the length of each of the auxiliary ribs 4b as illustrated in FIG. 5, thereby allowing the main ribs 4a to protect the upper and lower members 2, 3 against various external forces that may tear the upper and lower members 2, 3 apart. On the other hand, the auxiliary ribs 4b protect the upper and lower members 2, 3 against the external force that may split the spoiler 1 back into the upper and lower members 2, 3 as illustrated in FIGS. 9A and 9B.

At the time of molding of the lower member 3, the main ribs 4a and the auxiliary ribs 4b are molded integrally therewith so as to protrude vertically from the upper end face 35a. The height of each of the auxiliary ribs 4b is less than a height of each of the main ribs 4a, and the auxiliary ribs 4b are located at a distance from the main ribs 4a. Furthermore, similarly to the welding ribs 4 provided on the flat plate portion 31, a gap $\epsilon$ of at least 2 mm is provided at a spaced region CR between each of the main ribs 4a and each of the auxiliary ribs 4b.

A wall thickness of each of the welding ribs 4, including the main ribs 4a and auxiliary ribs 4b, on the flat plate portion 31, the upright portion 34 and the columnar supports 35, is about 1 mm so that good appearance of the spoiler 1 can be ensured.

In the exemplary embodiment, the spoiler 1 further includes the electronic device components 5 attached to a non-vibrating one of the upper and lower members 2, 3 (the lower member 3 in the exemplary embodiment), and foam pads 7 attached to upper faces of the electronic device components 5.

Prior to vibration welding, the electronic device components 5, to which the foam pads 7 are attached, are attached to the lower member 3 as illustrated in FIGS. 1 and 4. In this exemplary embodiment, the electronic device components 5 include the FM/AM radio antenna 5a attached to a center region of the recess u of the lower member 3, and a pair of the digital TV antennas 5b attached to lateral side regions of the recess u. The elastically deformable foam pads 7 are attached to upper faces of the respective antennas 5a, 5b as illustrated in FIG. 4. With these foam pads 7 kept in compressed state such that the foam pads 7 touches the upper member 2 (vibrating member), the upper and lower members 2, 3 are joined together by vibration welding to provide the spoiler 1.

Figure 8A:
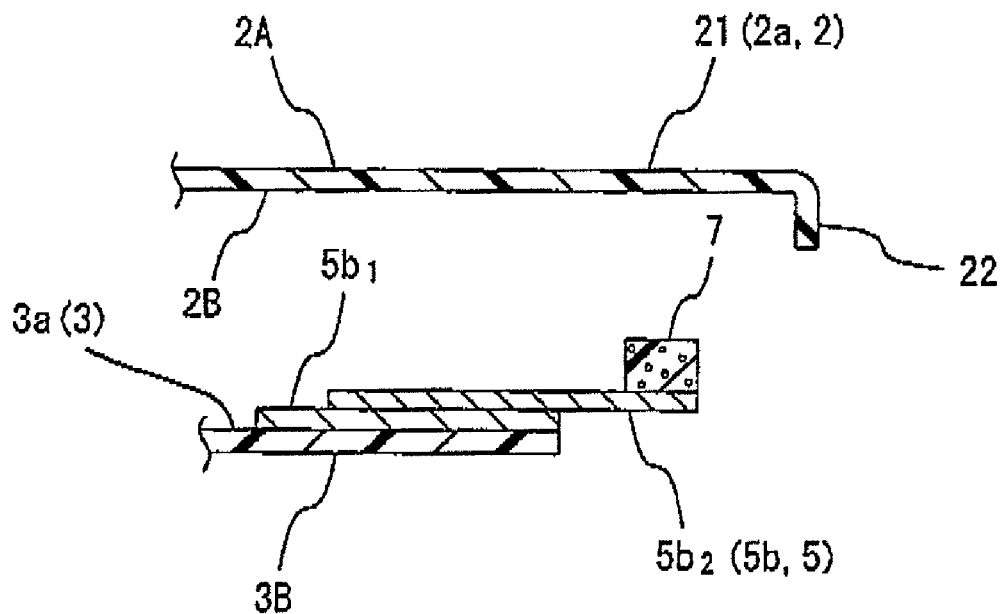
FIG. 8A is a sectional view of a portion around an electronic device component before a vibration welding.
Figure 8B:
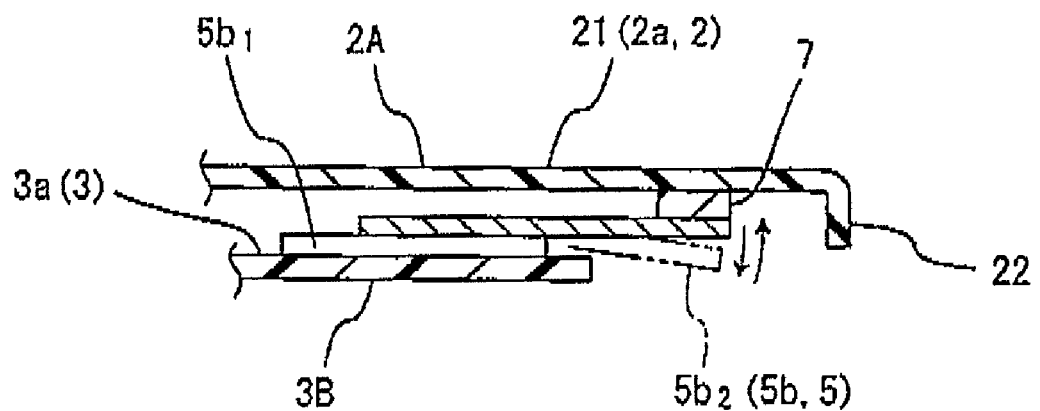
FIG. 8B is a sectional view of the portion around the electronic device component after the vibration welding.

The foam pads 7 are attached to the upper faces of the respective electronic device components 5 in order to prevent the electronic device components 5 from being damaged during the vibration welding. The upper and lower members 2, 3 are joined together by the vibration welding with the foam pads 7 kept in the compressed state such that the foam pads 7 touches the upper member 2. This can protect the electronic device components 5 also against vibrations while the vehicle is moving after mounting the spoiler 1 on the vehicle. For example, the foam pad 7 provided on the digital TV antenna 5b illustrated in FIG. 4 is attached onto a protruded part $5b_2$ protruded outward from a substrate $5b_1$ of the antenna 5b. The foam pad 7 is non-loaded prior to welding as illustrated in FIG. 8A. During the vibration welding, the foam pad 7 is compressed such that the foam pad 7 touches the upper member 2 as illustrated in FIG. 8B. In this state, the upper and lower members 2, 3 are joined together by the vibration welding to produce the spoiler 1.

The foam pad 7 is a piece of a soft foam sheet such as urethane sheet having a good cushioning property. In the exemplary embodiment, the foam pad 7 includes a base formed by an EPDM rubber foam, an adhesive layer on a lower face of the base, and a release liner covering the adhesive. For example, EPT SEALER (trade name, product of Nitto Denko Corporation) may be used as the foam pad 7. The release liner is peeled off, and then the foam pad 7 is attached to the upper face of the associated electronic device component 5.

When manufacturing the spoiler 1, the upper member 2, the lower member 3, the electronic device components 5 and the foam pads 7 are prepared.

Prior to vibration welding, the upper and lower members 2, 3 are painted in accordance with a two-tone color of the spoiler 1. After the panting, as illustrated in FIG. 4, the FM/AM radio antenna 5a and digital TV antennas 5b are fixed to the lower member 3 (a non-vibrating member) using fasteners 6 such as screws. The electronic device components 5 are not attached to the upper member 2 which is a vibrating member, because if the electronic device components 5 are attached to the upper member 2, there is the danger of damaging the electronic device components 5 due to vibrations at the time of vibration welding. Subsequently, the rectangular foam pads 7 are attached to the upper faces of the antennas 5a, 5b (i.e., surfaces thereof facing the upper member 2). The foam pads 7 are attached to the surfaces of the electronic device components 5, opposed to the vibrating member (i.e., the upper member 2 in this exemplary embodiment). In other words, the foam pads 7 are attached at positions where the electronic device components 5 are likely to be damaged at the time of vibration welding, or at positions where the electronic device components 5 are likely to be vibrated due to vibrations while the vehicle mounting the spoiler 1 is moving.

Next, as illustrated in FIGS. 2 and 3, the lower member 3, to which the antennas are attached, is set on a lower jig 8, and the painted upper member 2 is set on an upper jig 9. Thereafter, the upper jig 9 is lowered, thereby bringing about a vibration welding stand-by state. Wiring of the electronic device components 5, such as a harness, is led outside of the lower jig 8 through a hole in the lower member 3.

Then, vibration welding is carried out with, for example, an amplitude width of 1.5 mm or less and a frequency of 100 Hz or more. The upper and lower members 2, 3 are pressed in a bonding direction, and the upper member 2 is vibrated via the upper jig 9 in a longitudinal direction of the spoiler 1 along which the main ribs 4a extend. During the vibration welding, the foam pads 7 are elastically compressed. A bonding region of an upper part (i.e., a melting margin $h_1$) of each of the main ribs 4a is partially molten due to friction energy, and subsequently a bonding region of an upper part (i.e., a melting margin $h_2$) of each of the auxiliary ribs 4b is partially molten due to friction energy. These bonding regions are welded, thus obtaining the desired spoiler 1 in which the upper and lower members 2, 3 are joined together.

In FIG. 3, the upper parts of the main ribs 4a and auxiliary ribs 4b interfering with the upper member 2 above the intersecting solid lines represent the melting margins $h_1$ and $h_2$ of the welding ribs 4 by which the upper and lower members 2, 3 are welded and joined. The reference sign "$h_3$" denotes a residual portion remaining after the welding of the main ribs 4a and auxiliary ribs 4b and the upper member 2.

Figure 9C:
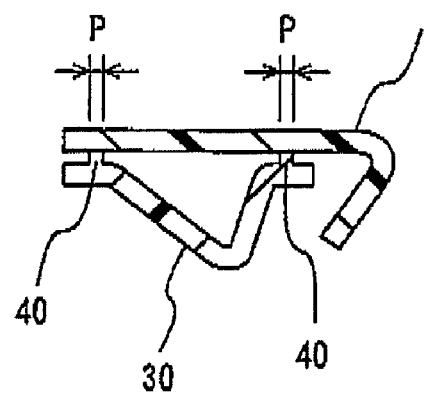
FIG. 9C is a sectional view of the related art spoiler taken along the line IX-IX in FIG. 9A.

According to the spoiler 1 described above, the flat plate portion 31, forming the front side part of the spoiler 1, has the main ribs 4a elongated along the vehicle width direction which is the vibration direction of the vibration welding, and the upright portion 34 forming the rear part of the spoiler 1 has the main rib 34a extending along the vehicle width direction. Thus, similarly to a related art welded spoiler, the spoiler 1 is configured to guard the upper and lower members 2, 3 against an external tearing force. However, in the related art spoiler having no auxiliary ribs 4b, the spoiler is easily split into the upper and lower members upon application of an external force like a splitting force as illustrated in FIGS. 9A and 9B. In the related art spoiler, as illustrated in FIG. 9C, the ribs 40 extending in the vehicle width direction merely provides support with a width P and therefore, splitting in the vehicle width direction is easily caused as illustrated in FIG. 9B.

To the contrary, the spoiler 1 according to the exemplary embodiment includes the auxiliary ribs 4b extending in the direction perpendicular to the vibration direction, and therefore, the auxiliary ribs 4b can resist against the external force illustrated in FIGS. 9A and 9B. As illustrated in FIG. 3, the main ribs 4a merely provides support with a width P corresponding to its thickness, but the auxiliary ribs 4b can resist against the splitting external force using its entire lengths L. Since the auxiliary ribs 4b are provided along the direction perpendicular to the vibration direction, the splitting external force is prevented by making the most of the lengths L of the auxiliary ribs 4b.

Moreover, the auxiliary ribs 4b are arranged between the longitudinal ends of the flat plate portion 31 and the main ribs 4a. Therefore, it is possible to effectively inhibit an initial action that tears off the spoiler 1, elongated in the vehicle width direction, from the longitudinal end of the spoiler 1.

Further, the height of each of the auxiliary ribs 4b is less than a height of each of the main ribs 4a. Therefore, it is possible to solve this problem that the auxiliary ribs 4b may flutter due to vibrations at the time of vibration welding. Furthermore, the auxiliary ribs 4b are located at a distance from the main ribs 4a. Therefore, a space for a molten resin to escape during the vibration welding is provided, thereby preventing sink marks. Since the gap ε of 2 mm or more is provided between each of the main ribs 4a and each auxiliary rib 4 at the spaced region CR, a sufficient escape space is ensured for a molten resin during the vibration welding, thereby preventing degradation of an external appearance of the spoiler 1.

In addition, the main ribs 4a and auxiliary ribs 4b are also provided on the upper end faces 35a of the columnar supports 35. Therefore, the upper and lower members 2, 3 are joined together in a more reinforced manner by utilizing an empty space in the lower member 3.

Further, since the foam pads 7 are attached to the surfaces of the electronic device components 5, opposed to the member vibrating at the time of welding, the foam pads 7 can protect the electronic device components 5, such as the antennas, at the time of a vibrating operation during vibration welding in fabricating the spoiler 1, and can prevent the electronic device components 5 from being damaged. Moreover, the upper and lower members 2, 3 are joined together in which the foam pads 7 are placed in the compressed manner. Therefore, the electronic device components 5 are prevented from being damaged even when the vehicle, to which the spoiler 1 is attached, is vibrated while moving. For example, when the electronic device component 5 is swung as illustrated in FIG. 8B due to vibrations while the vehicle is moving, the foam pad 7 exerts an elastically expanding-contracting action, thereby achieving outstanding effects in absorbing the vibrations and in protecting the electronic device component 5.

Besides, the vibration welding can be carried out after painting the upper and lower members 2, 3. Therefore, two-tone spoilers can be provided with low cost and with good quality.

While the present invention has been described with reference to a certain exemplary embodiment thereof, the scope of the present invention is not limited to the exemplary embodiment described above, and it will be understood by those skilled in the art that various changes and modifications may be made therein.

For example, shapes, sizes, numbers, etc. of elements of the spoiler 1, such as the upper member 2, the lower member 3, the main ribs 4a, the auxiliary ribs 4b, the columnar supports 35, the electronic device components 5, the melting margins $h_1$ and $h_2$ may be appropriately selected in accordance with usage. For example, in the exemplary embodiment, the lower member 3 has the main ribs 4a and the auxiliary ribs 4b and is the non-vibrating member, and the upper member 2 is the vibrating member. However, the lower member 3 may be the vibrating member and the upper member 2 may be the non-vibrating member when carrying out the vibration welding. Further, the main ribs 4a and the auxiliary ribs 4b may be arranged on the upper member 2. The electronic device components 5 are not limited to the TV antennas, and may include a wiper motor, a wiper blade, etc.

What is claimed is:

1. A spoiler comprising an upper member and a lower member, wherein
    the upper member and the lower member are made of a synthetic resin and are joined together by vibration welding,
    one of the upper member and the lower member comprises a main welding rib and an auxiliary welding rib,
    each of the main welding rib and the auxiliary welding rib is protruded toward the other of the upper member and the lower member so as to be vibration welded to the other of the upper member and the lower member,
    the main welding rib is arranged to extend along a vibration direction of the vibration welding,
    the auxiliary welding rib is arranged to extend along a direction perpendicular to the vibration direction,
    a height of the auxiliary welding rib is less than a height of the main welding rib before the vibration welding, and
    the auxiliary welding rib is spaced apart from the main welding rib.

2. The spoiler according to claim 1, wherein the main welding rib is elongated along a longitudinal direction of the one of the upper member and the lower member, and
    the auxiliary welding rib is arranged outside of the main welding rib with respect to a longitudinal direction of the main welding rib such that the auxiliary welding rib intersects an imaginary extension line extending from a longitudinal end of the main welding rib and parallel to the longitudinal direction of the main welding rib.

3. The spoiler according to claim 1, wherein the one of the upper member and the lower member further comprises a columnar support which is bulged toward the other of the upper member and the lower member, and
    the columnar support comprises a distal face on which the main welding rib and the auxiliary welding rib are arranged.

4. The spoiler according to claim 1, wherein the auxiliary welding rib is arranged at a distance of at least 2 mm from the main welding rib.

5. The spoiler according to claim 1, further comprising:
    an electronic device component attached to a non-vibrating one of the upper member and the lower member that is not vibrated during the vibration welding; and
    a foam pad attached to the electronic device component such that the foam pad is arranged in a compressed manner between the electronic device component and a vibrating one of the upper member and the lower member that is vibrated during the vibration welding.

* * * * *